US008208247B2

(12) United States Patent
Cheng et al.

(10) Patent No.: US 8,208,247 B2
(45) Date of Patent: Jun. 26, 2012

(54) UNLOADING MECHANISM FOR UNLOADING AN ELECTRONIC COMPONENT AND COMPUTER DEVICE THEREOF

(75) Inventors: Wen-Chieh Cheng, Taipei Hsien (TW); Chih-Yi Wang, Taipei Hsien (TW); Jung-Pin Kao, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 166 days.

(21) Appl. No.: 12/886,553

(22) Filed: Sep. 20, 2010

(65) Prior Publication Data

US 2011/0222226 A1 Sep. 15, 2011

(30) Foreign Application Priority Data

Mar. 15, 2010 (TW) .............................. 99107460 A

(51) Int. Cl.
*H05K 5/00* (2006.01)
*H05K 7/00* (2006.01)

(52) U.S. Cl. .......... 361/679.02; 361/679.33; 361/679.35

(58) Field of Classification Search ............. 361/679.02, 361/679.33, 679.35
See application file for complete search history.

(56) References Cited

U.S. PATENT DOCUMENTS

| | | | | |
|---|---|---|---|---|
| 5,197,894 A | * | 3/1993 | Koike ........................... 439/159 |
| 5,299,089 A | * | 3/1994 | Lwee ........................ 361/679.33 |
| 5,499,925 A | * | 3/1996 | Lwee ............................. 439/157 |
| 5,655,918 A | * | 8/1997 | Soh ................................ 439/159 |
| 5,793,607 A | * | 8/1998 | Karidis et al. ............ 361/679.38 |
| 5,836,775 A | * | 11/1998 | Hiyama et al. ................ 439/159 |
| 5,863,212 A | * | 1/1999 | Duesterhoeft ................ 439/160 |
| 5,907,354 A | * | 5/1999 | Cama et al. ................ 348/231.7 |
| 5,923,541 A | * | 7/1999 | Yasumi ......................... 361/798 |
| 6,115,245 A | * | 9/2000 | Ruch et al. ............... 361/679.58 |
| 6,252,514 B1 | * | 6/2001 | Nolan et al. ................ 340/686.4 |
| RE37,265 E | * | 7/2001 | Lwee ............................. 439/157 |
| 6,287,143 B1 | * | 9/2001 | Lwee ......................... 439/541.5 |
| 6,991,480 B2 | * | 1/2006 | Katayanagi et al. .......... 439/159 |
| 6,992,886 B2 | * | 1/2006 | Salinas et al. ............ 361/679.38 |
| 2005/0136712 A1 | * | 6/2005 | Katayanagi et al. .......... 439/139 |

* cited by examiner

*Primary Examiner* — Anthony Haughton
(74) *Attorney, Agent, or Firm* — Winston Hsu; Scott Margo

(57) ABSTRACT

An unloading mechanism includes a base and a pushing component installed on the base for pushing an electronic component out of a computer device. The unloading mechanism further includes a latch for latching the pushing component. When the electronic component pushes a first end of the pushing component in a first direction, a second end of the pushing component drives the latch to move in a second direction. The unloading mechanism further includes a first resilient component connected between the latch and the base for driving the latch to move in a direction opposite to the second direction, and a second resilient component connected between the pushing component and the base for driving the pushing component to move in a direction opposite to the first direction.

18 Claims, 5 Drawing Sheets

UNLOADING MECHANISM FOR UNLOADING AN ELECTRONIC COMPONENT AND COMPUTER DEVICE THEREOF

BACKGROUND OF THE INVENTION

1. Field of the Invention

The present invention relates to an unloading mechanism, and more particularly, to an unloading mechanism for unloading an electronic component and a related computer device.

2. Description of the Prior Art

Electronic components of a notebook computer, such as a battery or a portable hard disk, are conventionally installed on a bottom of the notebook computer. In conventional mechanical design, a user overturns the notebook computer to assemble or disassemble the electronic components from a casing of the notebook computer via a conventional lock mechanism. Generally, the user operates the conventional lock mechanism by both hands, which means the conventional lock mechanism is complicated and difficult to operate, so that the inconvenient operation affects impression and satisfaction of the electronic product. Thus, design of a lock mechanism having convenient assembly and disassembly is an important issue of the mechanism design industry.

SUMMARY OF THE INVENTION

The present invention provides an unloading mechanism for unloading an electronic component and a related computer device for solving above drawbacks.

According to the claimed invention, an unloading mechanism includes a base, and a pushing component installed on the base in a movable manner for pushing an electronic component out of a computer device. A sunken part is formed on the pushing component. The unloading mechanism further includes a latch installed on the base in a movable manner for latching the sunken part of the pushing component. The electronic component pushes a first end of the pushing component in a first direction and a second end of the pushing component driving the latch in a second direction different from the first direction when the electronic component is installed inside the computer device. The unloading mechanism further includes a first resilient component connected between the latch and the base for driving the latch in a direction opposite to the second direction so that the latch latches the sunken part of the pushing component when the latch does not contact against the second end of the pushing component, and a second resilient component connected between the pushing component and the base for driving the pushing component in a direction opposite to the first direction so that the pushing component pushes the electronic component out of the computer device when the latch does not latch the sunken part of the pushing component.

According to the claimed invention, the base comprises a first constraining structure for guiding the pushing component to move in the first direction.

According to the claimed invention, the first constraining structure is a slot or a wall.

According to the claimed invention, the base comprises a second constraining structure for guiding the latch to move in the second direction.

According to the claimed invention, the second constraining structure is a slot or a wall.

According to the claimed invention, a pushing button connected to the latch for moving the latch in the second direction so as to disengage the latch from the sunken part of the pushing component.

According to the claimed invention, the latch comprises a protruding part, a first inclined surface is formed on an end of the protruding part, a second inclined surface is formed on the second end of the pushing component, and the first inclined surface of the protruding part slides relative to the second inclined surface of the pushing component so as to drive the latch in the second direction when the electronic component pushes the first end of the pushing component in the first direction.

According to the claimed invention, the second resilient component drives the end of the protruding part of the latch to move the second end of the pushing component in the direction opposite to the first direction so that the pushing component pushes the electronic component out of the computer device when the latch is disengaged from the sunken part of the pushing component.

According to the claimed invention, a computer device includes a casing, an electronic component disposed inside the casing, and an unloading mechanism for unloading the electronic component out of the casing. The unloading mechanism includes a base, and a pushing component installed on the base in a movable manner for pushing an electronic component out of a computer device. A sunken part is formed on the pushing component. The unloading mechanism further includes a latch installed on the base in a movable manner for latching the sunken part of the pushing component. The electronic component pushes a first end of the pushing component in a first direction and a second end of the pushing component driving the latch in a second direction different from the first direction when the electronic component is installed inside the computer device. The unloading mechanism further includes a first resilient component connected between the latch and the base for driving the latch in a direction opposite to the second direction so that the latch latches the sunken part of the pushing component when the latch does not contact against the second end of the pushing component, and a second resilient component connected between the pushing component and the base for driving the pushing component in a direction opposite to the first direction so that the pushing component pushes the electronic component out of the computer device when the latch does not latch the sunken part of the pushing component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
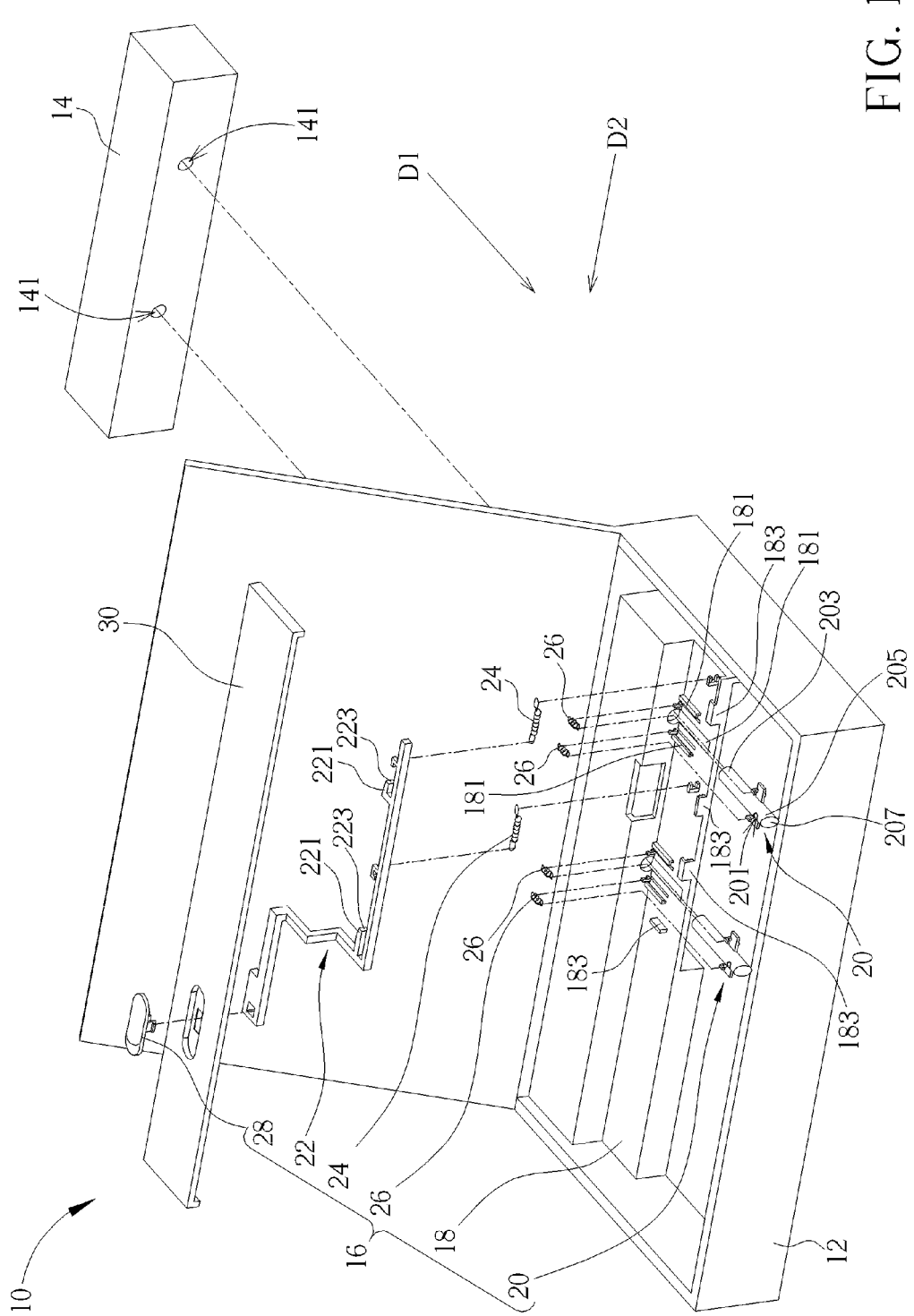
FIG. 1 is an exploded diagram of a computer device according to a preferred embodiment of the present invention.
Figure 2:
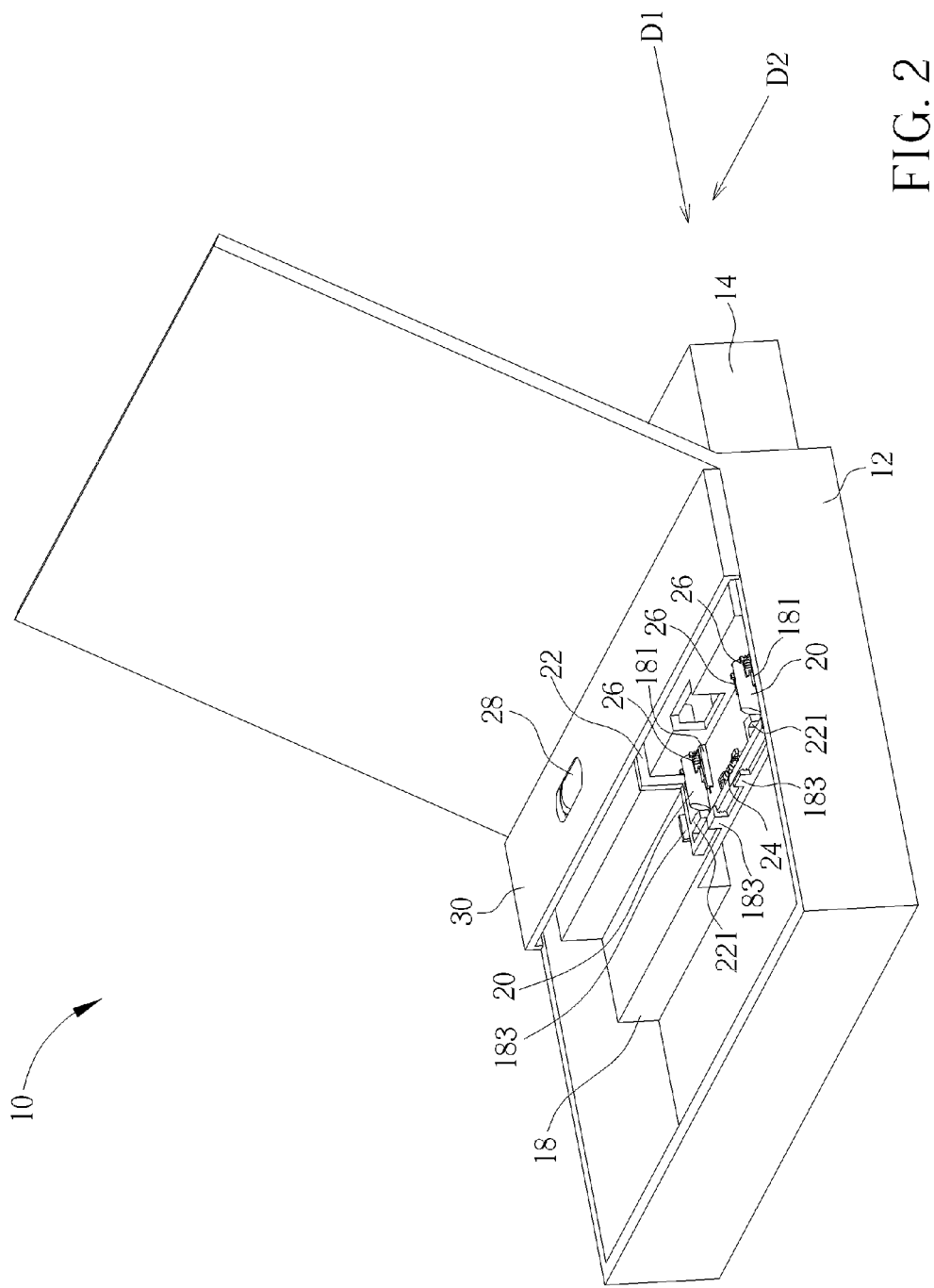
FIG. 2 is a schematic drawing of the computer device according to the preferred embodiment of the present invention.

Please refer to FIG. 1 and FIG. 2. FIG. 1 is an exploded diagram of a computer device 10 according to a preferred embodiment of the present invention. FIG. 2 is a schematic drawing of the computer device 10 according to the preferred embodiment of the present invention. The computer device 10 includes a casing 12, an electronic component 14, and an unloading mechanism 16. The computer device 10 can be a notebook computer. The electronic component 14 can be installed inside the casing 12 through a lateral side of the computer device 10 in a detachable manner. For example, the electronic component 14 can be a battery or a portable hard disk. The unloading mechanism 16 unloads the electronic component 14 from the casing 12. The unloading mechanism 16 includes a base 18 and at least one pushing component 20 disposed on the base 18 in a movable manner for pushing the electronic component 14 out of the casing 12. A sunken part 201 is formed on the pushing component 20. The unloading mechanism 16 further includes a latch 22 disposed on the base 18 in a movable manner. The latch 22 latches the sunken part 201 of the pushing component 20 for constraining movement of the pushing component 20. The unloading mechanism 16 further includes at least one first resilient component 24 connected between the latch 22 and the base 18, and at least one second resilient component 26 connected between the pushing component 20 and the base 18. The first resilient component 24 and the second resilient component 26 provide resilient forces to the latch 22 and the pushing component 20, respectively. In addition, the unloading mechanism 16 can further include a pushing button 28 connected to the latch 22 for driving the latch 22 to depart from the sunken part 201 of the pushing component 20. The pushing button 28 and the latch 22 can be disposed on two sides of a bezel 30 of the computer device 10, respectively. For example, the latch 22 can be disposed between the bezel 30 and the casing 12, and the pushing button 28 can be disposed on an upper surface of the bezel 30 for easy manipulation. At least one fixing hole 141 can be formed on a surface of the electronic component 14 for engaging with a first end 203 of the pushing component 20.

The base 18 of the unloading mechanism 16 can include at least one first constraining structure 181 disposed around the pushing component 20 for guiding the pushing component 20 to move in a first direction D1. The base 18 can further include at least one second constraining structure 183 disposed around the latch 22 for guiding the latch 22 to move in a second direction D2 different from the first direction D1. The first direction D1 can be perpendicular to the second direction D2, substantially. The first constraining structure 181 and the second constraining structure 183 can be a slot or a wall, respectively. In addition, the latch 22 can include at least one protruding part 221. A first inclined surface 223 can be formed on an end of the protruding part 221, and a second inclined surface 207 can be formed on a second end 205 of the pushing component 20. When the first end 203 of the pushing component 20 moves in the first direction D1 pushed by the electronic component 14, the first inclined surface 223 of the protruding part 221 slides relative to the second inclined surface 207 of the pushing component 20, so as to drive the latch 22 in the second direction D2. In this embodiment, numbers and positions of the pushing component 20, the second resilient component 26 connected to the pushing component 20, and the first resilient component 24 connected to the latch 22 of the unloading mechanism 16 are not limited to ones of this embodiment, and depend on actual design.

Figure 3:
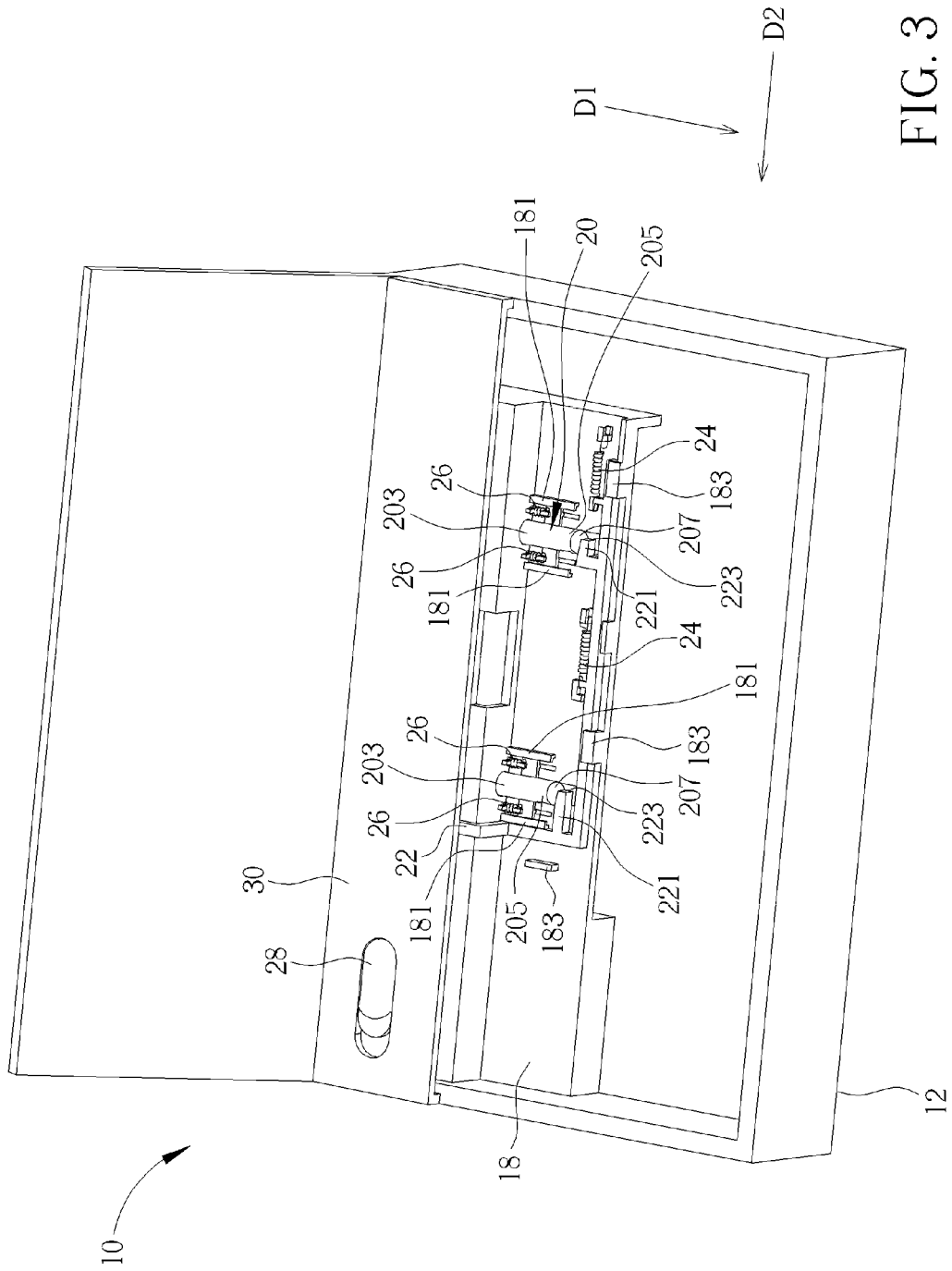
FIG. 3 is a diagram of an electronic component not being installed inside a casing according to the preferred embodiment of the present invention.
Figure 4:
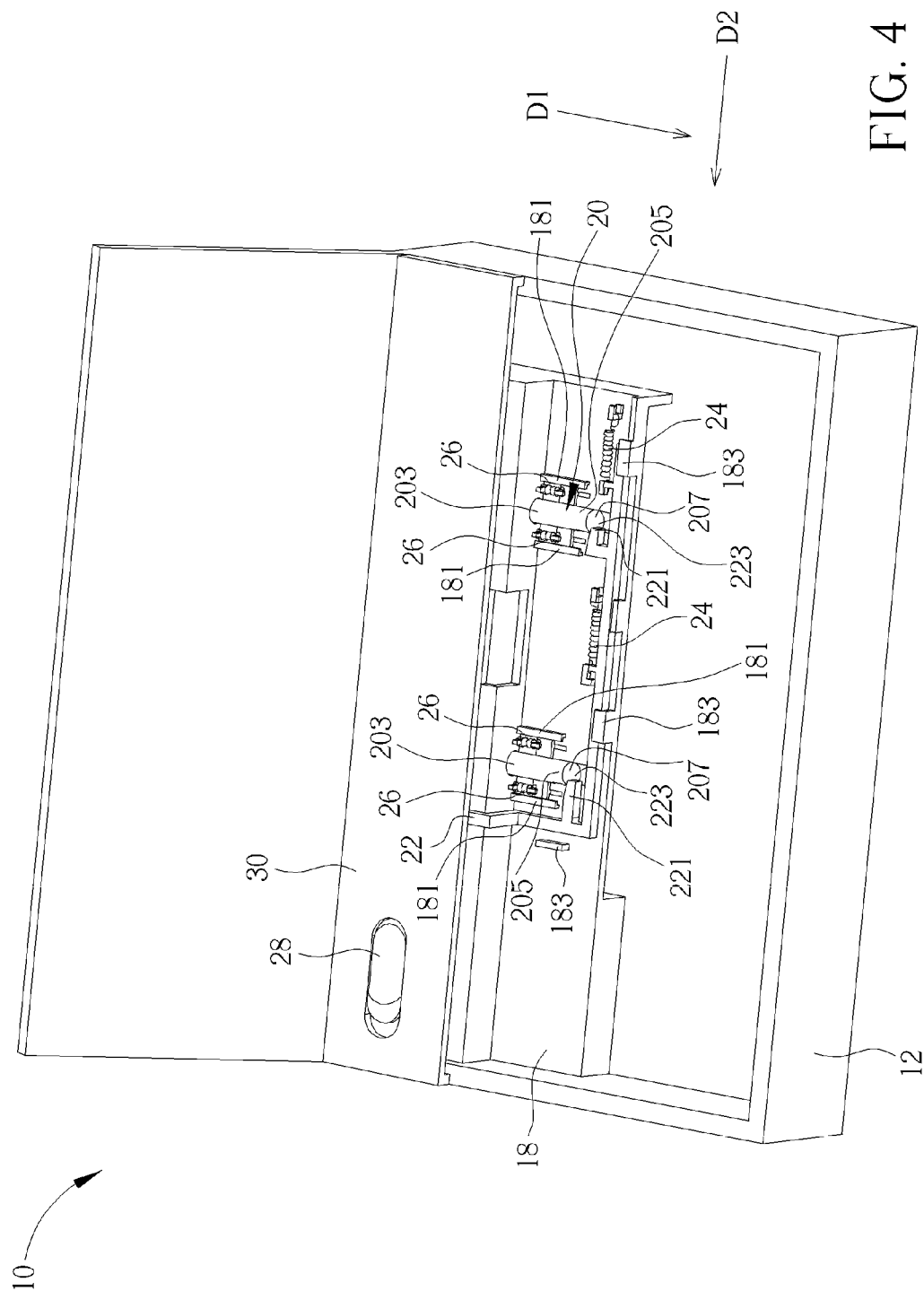
FIG. 4 is a diagram of the electronic component partly installed inside the casing according to the preferred embodiment of the present invention.
Figure 5:
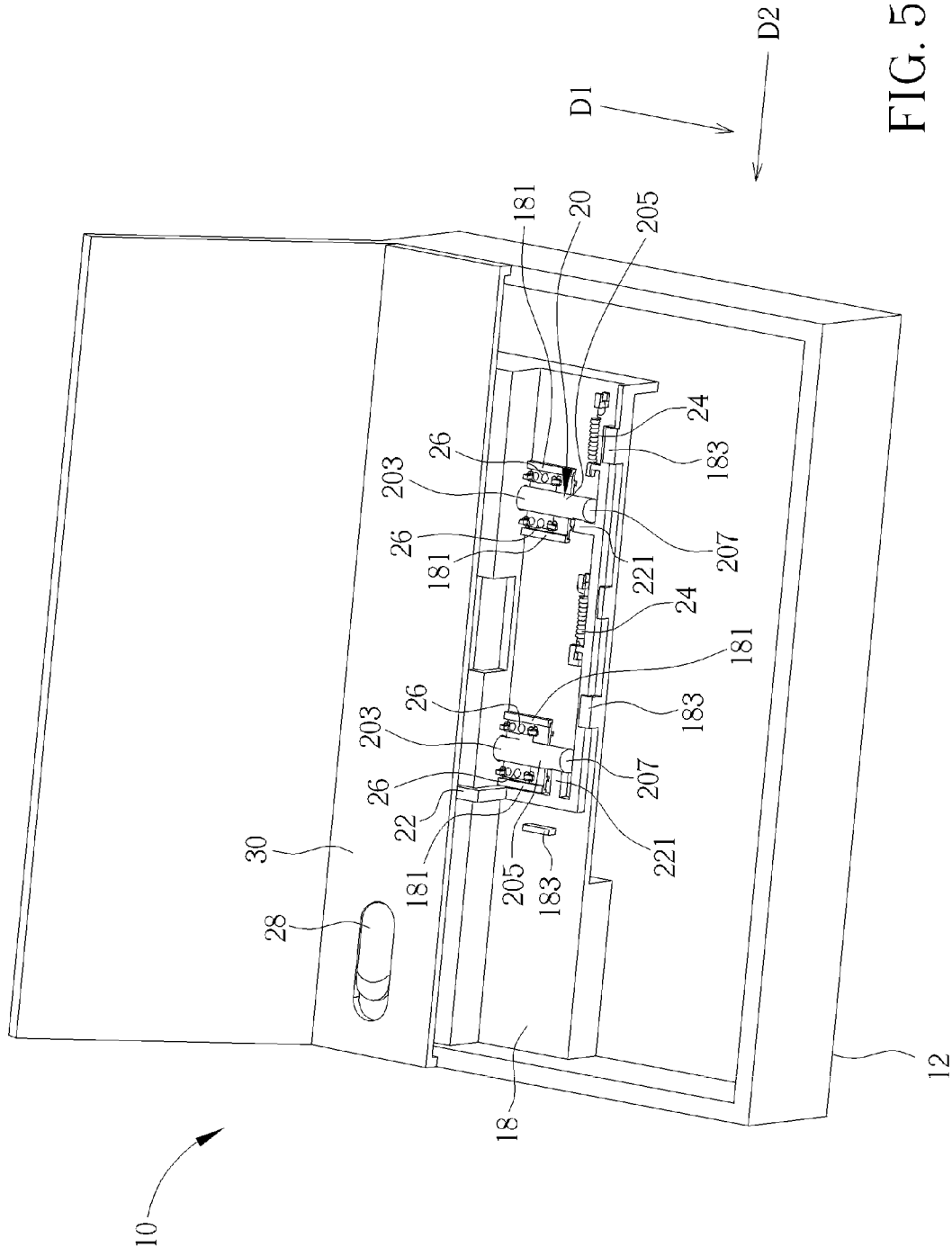
FIG. 5 is a diagram of the electronic component completely installed inside the casing according to the preferred embodiment of the present invention.

Operating procedures of the unloading mechanism 16 and the related computer device 10 are introduced as follows. Please refer to FIG. 1, FIG. 2, and FIG. 3 to FIG. 5. FIG. 3 is a diagram of the electronic component 14 not being installed inside the casing 12 according to the preferred embodiment of the present invention. FIG. 4 is a diagram of the electronic component 14 partly installed inside the casing 12 according to the preferred embodiment of the present invention. FIG. 5 is a diagram of the electronic component 14 completely installed inside the casing 12 according to the preferred embodiment of the present invention. As shown in FIG. 3, the second inclined surface 207 of the pushing component 20 contacts against an upper part of the first inclined surface 223 of the latch 22 when the electronic component 14 is not installed inside the casing 12. Meanwhile, the first resilient component 24 connected between the latch 22 and the base 18 and the second resilient component 26 connected between the pushing component 20 and the base 18 are unforced and in an initial status, respectively.

As shown in FIG. 4, when the electronic component 14 is installed inside the casing 12 partly, the electronic component 14 pushes the first end 203 of the pushing component 20 in the first direction D1. At this time, the first constraining structure 181 can keep the pushing component 20 moving in the first direction D1, and the fixing hole 141 of the electronic component 14 is engaged with the first end 203 of the pushing component 20, so that the second end 205 of the pushing component 20 moves in the first direction D1, and the second inclined surface 207 of the pushing component 20 slides relative to the first inclined surface 223 of the protruding part 221 of the latch 22 for driving the protruding part 221 of the latch 22 in the second direction D2. In addition, the second constraining structure 183 can keep the latch 22 moving in the second direction D2. In this procedure, the first resilient component 24 connected to the latch 22 and the second resilient component 26 connected to the pushing component 20 are forced, such as being stretched.

As show in FIG. 5, when the electronic component 14 pushes the first end 203 of the pushing component 20 in the first direction D1 continuously and the second inclined surface 207 of the pushing component 20 slides relative to a lower part of the first inclined surface 223 of the latch 22, the latch 22 does not contact against the second end 205 of the pushing component 20, and the sunken part 201 of the pushing component 20 moves to a position corresponding to the protruding part 221 of the latch 22, so that the first resilient component 24 can be recovered from the forced status to the initial status, so as to drive the latch 22 in a direction opposite to the second direction D2. Then, the protruding part 221 of the latch 22 latches the sunken part 201 of the pushing component 20, and the electronic component 14 is fixed inside the casing 12. Meanwhile, the second resilient component 26 connected to the pushing component 20 is still forced, such as being stretched.

On the other hand, when the electronic component 14 is unloaded from the casing 12, the pushing button 28 can be operated to drive the latch 22 in the second direction D2, so that the latch 22 departs from the sunken part 201 of the pushing component 20. At this time, the second resilient component 26 can be recovered from the forced status, such as being stretched, to the initial status, so as to drive the pushing component 20 in a direction opposite to the first direction D1. Therefore, the pushing component 20 pushes the electronic component 14 out of the casing 12 via a resilient recovering force of the second resilient component 26.

Comparing to the prior art, the unloading mechanism and the related computer device of the present invention can assemble and disassemble the electronic components from the casing easily and rapidly. The unloading mechanism of the present invention has advantages of simple structural disposition and low manufacturing cost. In addition, a user can conveniently install the electronic component inside the casing through the lateral side of the computer device without overturning the computer device, and can easily unload the electronic component out of the casing via the unloading mechanism with operation of the pushing button disposed on the bezel of the computer device. The unloading mechanism and the related computer device of the present invention can achieve easy operation of assembly procedures of the electronic components and decrease the operating time effectively.

Those skilled in the art will readily observe that numerous modifications and alterations of the device and method may be made while retaining the teachings of the invention.

What is claimed is:

1. An unloading mechanism comprising:
    a base;
    a pushing component installed on the base in a movable manner for pushing an electronic component out of a computer device, a sunken part being formed on the pushing component;
    a latch installed on the base in a movable manner for latching the sunken part of the pushing component, the electronic component pushing a first end of the pushing component in a first direction and a second end of the pushing component driving the latch in a second direction different from the first direction when the electronic component is installed inside the computer device;
    a first resilient component connected between the latch and the base for driving the latch in a direction opposite to the second direction so that the latch latches the sunken part of the pushing component when the latch does not contact against the second end of the pushing component; and
    a second resilient component connected between the pushing component and the base for driving the pushing component in a direction opposite to the first direction so that the pushing component pushes the electronic component out of the computer device when the latch does not latch the sunken part of the pushing component.

2. The unloading mechanism of claim 1, wherein the base comprises a first constraining structure for guiding the pushing component to move in the first direction.

3. The unloading mechanism of claim 2, wherein the first constraining structure is a slot or a wall.

4. The unloading mechanism of claim 1, wherein the base comprises a second constraining structure for guiding the latch to move in the second direction.

5. The unloading mechanism of claim 2, wherein the second constraining structure is a slot or a wall.

6. The unloading mechanism of claim 1 further comprising:
    a pushing button connected to the latch for moving the latch in the second direction so as to disengage the latch from the sunken part of the pushing component.

7. The unloading mechanism of claim 1, wherein the latch comprises a protruding part, a first inclined surface is formed on an end of the protruding part, a second inclined surface is formed on the second end of the pushing component, and the first inclined surface of the protruding part slides relative to the second inclined surface of the pushing component so as to drive the latch in the second direction when the electronic component pushes the first end of the pushing component in the first direction.

8. The unloading mechanism of claim 7, wherein the second resilient component drives the end of the protruding part of the latch to move the second end of the pushing component in the direction opposite to the first direction so that the pushing component pushes the electronic component out of the computer device when the latch is disengaged from the sunken part of the pushing component.

9. A computer device comprising:
    a casing;
    an electronic component disposed inside the casing; and
    an unloading mechanism for unloading the electronic component out of the casing, the unloading mechanism comprising:
        a base;
        a pushing component installed on the base in a movable manner for pushing the electronic component out of the casing, a sunken part being formed on the pushing component;
        a latch installed on the base in a movable manner for latching the sunken part of the pushing component, the electronic component pushing a first end of the pushing component in a first direction and a second end of the pushing component driving the latch in a second direction different from the first direction when the electronic component is installed inside the computer device;
        a first resilient component connected between the latch and the base for driving the latch in a direction opposite to the second direction so that the latch latches the sunken part of the pushing component when the latch does not contact against the second end of the pushing component; and
        a second resilient component connected between the pushing component and the base for driving the pushing component in a direction opposite to the first direction so that the pushing component pushes the electronic component out of the computer device when the latch does not latch the sunken part of the pushing component.

10. The computer device of claim 9, wherein the base comprises a first constraining structure for guiding the pushing component to move in the first direction.

11. The computer device of claim 10, wherein the first constraining structure is a slot or a wall.

12. The computer device of claim 9, wherein the base comprises a second constraining structure for guiding the latch to move in the second direction.

13. The computer device of claim 12, wherein the second constraining structure is a slot or a wall.

14. The computer device of claim 9 further comprising:
    a pushing button connected to the latch for moving the latch in the second direction so as to disengage the latch from the sunken part of the pushing component.

15. The computer device of claim 9, wherein the latch comprises a protruding part, a first inclined surface is formed on an end of the protruding part, a second inclined surface is formed on the second end of the pushing component, and the first inclined surface of the protruding part slides relative to the second inclined surface of the pushing component so as to drive the latch in the second direction when the electronic component pushes the first end of the pushing component in the first direction.

16. The computer device of claim 15, wherein the second resilient component drives the end of the protruding part of the latch to move the second end of the pushing component in the direction opposite to the first direction so that the pushing component pushes the electronic component out of the casing when the latch is disengaged from the sunken part of the pushing component.

17. The computer device of claim 9, wherein a hole is formed on the electronic component for engaging with the first end of the pushing component.

18. The computer device of claim 9, wherein the electronic component is a battery.

* * * * *